Aug. 16, 1955 M. C. HOLTJE 2,715,718
VOLTAGE-SELECTION AND-COMPARISON SYSTEM AND METHOD
Filed May 13, 1954

INVENTOR.
MALCOLM C. HOLTJE
BY Rines and Rines
ATTORNEYS

United States Patent Office 2,715,718
Patented Aug. 16, 1955

2,715,718

VOLTAGE-SELECTION AND COMPARISON SYSTEM AND METHOD

Malcolm C. Holtje, West Concord, Mass., assignor to General Radio Company, Cambridge, Mass., a corporation of Massachusetts Application May 13, 1954, Serial No. 429,443

18 Claims. (Cl. 340—149)

The present invention relates to methods of and electric systems for selecting a predetermined voltage amplitude or for comparing the amplitude of a plurality of voltages. From a more specific point of view, the invention is primarily concerned with providing an automatic electrical indication when a changing voltage signal reaches or passes through a predetermined amplitude.

Various types of circuits have heretofore been evolved for the purpose of enabling the selection of a predetermined voltage amplitude or the comparison of the amplitude of a plurality of voltages. In recording systems, for example, it is often desired that a sharp, clear and rapid electrical indication be provided when the amplitude of a voltage signal reaches a predetermined value, or when the amplitude of a first voltage source or signal reaches equality with the amplitude of a second voltage source or signal. Such amplitude selection or comparison has heretofore been effected with the aid of one or more non-linear elements, the impedance of which varies non-linearly with the voltage applied thereto. Various types of non-linear elements, such as electron tubes, solid or crystal diodes and similar elements have been so utilized. Perhaps the simplest type of voltage-amplitude-comparison circuit involves the use of a single non-linear diode element to the anode of which a first voltage source may be connected and to the cathode of which a second voltage source may be connected through an impedance. When the voltages of the two voltage sources are of equal amplitude, the anode and the cathode of the diode are at the same potential and the diode will not conduct. When the voltage applied from the first voltage source to the anode becomes more positive than the voltage applied from the second voltage source through the impedance to the cathode, or the voltage applied to the cathode becomes more negative with respect to the voltage applied to the anode, the diode will conduct, and an output voltage may be obtained that is substantially equal to the voltage of the first voltage source. The diode, on the other hand, will not conduct if the voltage applied from the first voltage source to the anode is more negative than the voltage applied from the second voltage source to the cathode, or if the voltage applied to the cathode is more positive than the voltage applied to the anode. In such event, an output voltage equal substantially to that of the second voltage source will be obatined. The discontinuity provided at the transition point between conduction and non-conduction of the diode may therefore be utilized as an indication as to when the amplitudes of the voltages from the two voltages sources have become equal. In actual practice, however, such non-linear devices do not have a strictly sharp discontinuity characteristic, so that the output voltage will not indicate a sharp transition phenomenon. To the contrary, the degree of sharpness of the output-voltage indication will vary with the rate at which the amplitudes of the voltages from the voltage sources are changing through the voltage-amplitude equality condition. Amplitude comparison by this type of system, therefore, is decidedly frequency dependent and can only be relied upon as a reasonably accurate indication of the passage of the voltage amplitudes from the voltage sources through an equality condition when this passage takes place very rapidly. Such systems cannot, therefore, provide the high degree of universality, precision and reliability necessary in recording systems, and in particular, in high-speed recorders.

In an attempt to overcome these disadvantages, it has been proposed to utilize the non-linear element in a positive feedback circuit. The voltages from the two voltage sources to be compared, for example, may again be connected into circuit with a non-linear element, such as the before-mentioned diode. An amplifier, however, may be connected to the diode to receive part of the voltage output of the diode and to feed it back, under positive-feedback conditions, to the diode. The operation of this type of system may be viewed as dependent upon the variation in the attenuation or signal-amplitude loss produced by the varying impedance characteristics of the non-linear element as controlled by the applied voltages from the voltage sources. Part of the voltage so attenuated is amplified and fed back, as before-described, to compensate for the attenuation or signal-loss characteristic of the diode. Such a feedback process, however, imposes strict limitations upon the system. When the attenuation or signal-loss through the non-linear element is reduced to a point where the amplifier feedback loop provides a gain equal to or greater than unity, the feedback loop becomes regenerative. The output voltage, unlike that of the first-described prior-art diode amplitude-comparison circuit, is independent of the rate at which the applied voltages are changing since the rate of rise of the output voltage is determined only by the feedback response of the feedback loop. The sensitivity of the system, on the other hand, depends upon the non-linear attenuation characteristic of the diode and upon the gain of the feedback loop. Maximum sensitivity occurs when the non-linear element is operated at that voltage for which the rate of change of the resistance or impedance of the non-linear element with respect to the applied voltage is a maximum, and the attenuation through the non-linear element at such maximum point is two. The gain of the amplifier in the feedback loop, therefore, is restricted to a value of two for optimum sensitivity. Increasing the gain, only results in reducing the sensitivity of the circuit, so that this type of system is quite limited in available sensitivity.

An object of the present invention is to provide a new and improved method of and system for voltage selection and comparison that is not subject to any of the disadvantages of the prior-art devices above described, and that, to the contrary, is not only independent of the frequency or rate of change of the applied voltages, but is also adapted to attain a very high degree of sensitivity, imposing no limitation upon the usable gain of the system.

In accordance with the present invention, this end is attained through the use of a bridge circuit to which the voltage signals to be compared are applied and at least one arm of which comprises a non-linear device. The output of the bridge is connected to a differential amplifier to provide a pair of feedback loops of opposite polarity to the input of the bridge, whereby equality in the amplitude of the applied voltages is sharply indicated by the change in net feedback from the output to the input from one polarity to another.

Other and further objects will be explained hereinafter, and will be more particularly pointed out in the appended claims.

The invention will now be described in connection with the accompanying drawings, Fig. 1 of which is a schematic circuit diagram of electrical circuits arranged and constructed in accordance with the present invention;

Figure 1:
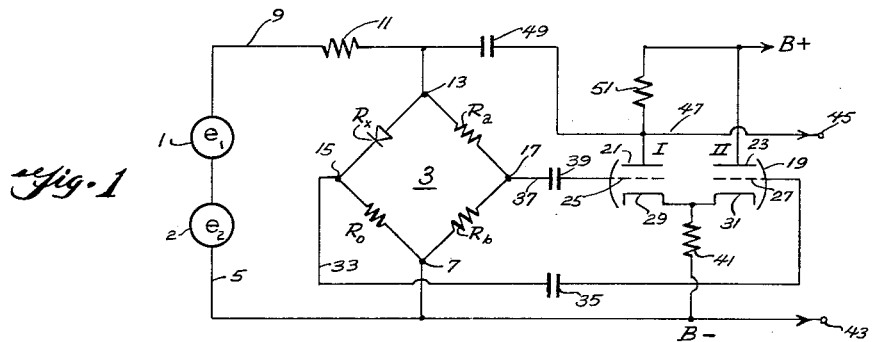

Referring to Fig. 1, for purposes of illustration, let it be assumed that a pair of voltages $e_1$ and $e_2$ are to be compared for the purpose of producing an indication when one voltage reaches or passes through a condition of amplitude equality with the other voltage. In order to maintain the illustration entirely general, the two voltages $e_1$ and $e_2$ are shown emanating from any desired voltage sources 1 and 2. These sources may comprise voltage generators, signal-detecting equipment or any other type of source. The voltages themselves may be of any desired nature, such as slowly or rapidly changing voltage signals. In certain types of monitoring and recording systems, the voltages may assume the form of voltage pulses. In Fig. 1, the sources 1 and 2 may be connected in series circuit to apply a voltage equal, for example, to $e_1-e_2$. The lower terminal of the source 2 is connected by a conductor 5 to the lower-vertex input terminal 7 of an electrical bridge 3. The upper terminal of the source 1 is similarly connected by a conductor 9 and through an impedance element 11, which may be a resistor, to the upper-vertex input terminal 13 of the bridge 3. The bridge is shown, for illustrative purposes, as of the four-arm, four-vertex Wheatstone type, though other types of electrical bridges may also be employed. Three of the arms of the bridge 3 are provided with fixed impedance elements, such as the resistors $R_a$, $R_b$ and $R_0$. The remaining arm comprises a non-linear element the impedance of which varies non-linearly with voltage. As before discussed, this non-linear element may assume the form of a diode $R_x$, as of the crystal type, having a resistance that varies with the applied voltage. The non-linear element $R_x$ is connected in series with the arm $R_0$ between the upper and lower-vertex input terminals 13 and 7. The arms $R_a$ and $R_b$ are similarly connected in series with each other and in parallel with the arms $R_x$ and $R_0$ between the input terminals 13 and 7. The output terminals of the bridge 3 are disposed at the left and right-hand vertices 15 and 17 at the points of series-connection of the respective pairs of arms $R_x$, $R_0$ and $R_a$, $R_b$.

The output terminals 15 and 17 of the bridge 3 are connected to a differential amplifier that, for purposes of illustration, is shown of the double-triode variety comprising a pair of three-electrode electron-tube amplifiers I and II that may be disposed within a common envelope 19. The tubes I and II are provided with respective anodes or plates 21 and 23, control-grid electrodes 25 and 27, and cathodes 29 and 31. The output terminal 15 is connected by a conductor 33 through a blocking condenser 35 to the control-grid electrode 27 of the amplifier II, and the output terminal 17 is connected by a conductor 37 through a blocking condenser 39 to the control-grid electrode 25 of the amplifier I. The cathodes 29 and 31 are connected together and through a resistor 41 to a terminal 43 that is also connected with the before-mentioned conductor 5. The terminal 43 serves as one of the output terminals of the complete voltage-comparison system and may be connected to the negative or B— side of the plate-supply voltage source for the amplifiers I and II. The other output terminal 45 of the system is connected by a conductor 47 to the plate 21 of the amplifier I and through a coupling condenser 49 to the upper vertex 13 of the bridge 3. The plates 21 and 23 of the respective amplifiers I and II are connected to the positive or B+ terminal of the plate-supply voltage source, the plate 21 being so connected through a plate load resistor 51. As will later be evident from a description of the operation of the system, other types of differential amplifier devices may obviously be substituted for the illustrated two-electron-tube type.

Depending upon the amplitude of the voltages $e_1$ and $e_2$ applied from the sources 1 and 2 between the upper and lower-vertex terminals 13 and 7 of the bridge 3, the impedance of the non-linear diode element $R_x$ will assume different values in accordance with the non-linear impedance-voltage characteristic of the diode $R_x$. The impedance value of the diode $R_x$ is thus a function of the algebraic sum of the voltages $e_1$ and $e_2$. Assume, for the moment, that the potential at the left-hand vertex terminal 15 of the bridge 3 were to rise positively. This voltage rise will be conveyed by conductor 33, through the condenser 35 to the control-grid electrode 27 of the amplifier II. The current in the amplifier II between its cathode 31 and its plate 23 will therefore increase, raising the voltage upon the cathode 31. Since, as previously described, the cathode 29 of the amplifier I is connected to the cathode 31 of the amplifier II, the cathode 29 also rises in potential, reducing the current through the amplifier I and permitting the plate 21 thereof to rise in potential. This last-named potential increase will be conveyed from the plate 21 through condenser 49 back to the upper-vertex input terminal 13 of the bridge 3, and thence through the non-linear diode element $R_x$ back to the left-hand output terminal 15 of the bridge 3. There has thus been provided a positive feedback loop from the output terminal 15 of the bridge 3 through the condenser 35 and the differential amplifier I, II, and back to the input terminal 13 of the bridge 3, involving no phase reversal.

Assume, on the other hand, that the voltage at the other bridge output terminal 17 were to rise. This voltage increase would be conveyed from the output terminal 17 through the condenser 39 to the control-grid electrode 25 of the amplifier I, increasing conduction through the amplifier I. The plate 21 of the amplifier I would then drop in potential so that there is fed back through the condenser 49 to the input terminal 13, a negative voltage. This negative voltage will return to the bridge output terminal 17 through the arm $R_a$, providing a negative feedback loop that involves phase reversal.

Depending upon which of the terminals 15 or 17 is at the greater or lesser potential as a result of the application of the voltages $e_1$ and $e_2$ to the input terminals 13, 7 of the bridge 3, therefore, there will be either a positive or a negative net voltage feedback from the output of the bridge 3 through the differential amplifier I, II, back to the input of the bridge 3. The ratio of the voltage, with respect to the B— terminal, at the output terminal 15 compared to that at the input terminal 13, may be expressed as follows:

$$\frac{Z_0}{Z_0+Z_x}$$

where $Z_0$ is the impedance of the arm $R_0$ and $Z_x$ is the impedance of the arm $R_x$. These impedances may be resistive or reactive, including capacitors or inductors. The non-linear element itself may comprise a capacitor the capacitance of which varies with applied voltage. For purposes of explanation, however, the impedances may be assumed as resistive, in which case the above-mentioned ratio may be expressed as:

$$\frac{R_0}{R_0+R_x}$$

where $R_0$ is the resistance of the arm $R_0$ and $R_x$ the resistance of the arm $R_x$. The ratio of the voltage, with respect to the B— terminal, at the output terminal 17 compared to that at the terminal 13, may similarly be expressed as:

$$\frac{R_b}{R_a+R_b}$$

where $R_a$ and $R_b$ are the resistance values of the respective arms $R_a$ and $R_b$. If the voltage at 15 is greater than that at 17, so that $$\frac{R_0}{R_0+R_x} \text{ is greater than } \frac{R_b}{R_a+R_b}$$

then the above-mentioned positive feedback loop will be effective in the system. When the reverse condition obtains, however, with $$\frac{R_b}{R_a+R_b} \text{ greater than } \frac{R_0}{R_0+R_x}$$

the before-described negative feedback loop controls. At the point of equality of the voltages at the bridge output terminals 15 and 17, however, where $$\frac{R_0}{R_0+R_x}=\frac{R_b}{R_a+R_b}$$

the net feedback is zero. Assuming the resistance values of the arms $R_a$ and $R_b$ to be equal, for example, at the applied voltage ($e_1-e_2$) at which the resistance of the non-linear element $R_x$ is equal to the resistance of the arm $R_0$, the voltage in the negative feedback loop is balanced exactly by the voltage in the positive feedback loop.

If, accordingly, the voltages $e_1$ and $e_2$ are such that the value of the impedance $R_x$ at the time the voltages $e_1$ and $e_2$ are of equal amplitude produces the relationship $$\frac{R_0}{R_0+R_x}=\frac{R_b}{R_a+R_b}$$

then the passing of the voltages $e_1$ and $e_2$ through the equal-amplitude condition will be sharply indicated by the switching of the system from positive to negative feedback, or vice versa. A decrease of the voltage $e_1$, for example, will cause the non-linear element $R_x$ to increase its impedance, decreasing the positive feedback and rendering the net feedback negative. The system is stable under such circumstances. An increase of $e_1$, however, will decrease the impedance of $R_x$, producing a net positive feedback. The circuit will then regenerate or oscillate when the loop gain exceeds unity. The point of equality of the voltages $e_1$ and $e_2$ is thus sharply indicated by the transition between a stable and an oscillatory state.

If the voltage $e_2$ is a reference voltage, the point of non-linear operation of the impedance $R_x$ and the value of $e_2$ will determine the predetermined voltage amplitude reference or level at which the indication is produced when the voltage $e_1$ reaches that predetermined amplitude. If there is no voltage $e_2$, indeed, and the non-linear transition region of the impedance $R_x$ is near zero voltage or some other predetermined value, the indication provided by a change from positive to negative feedback, or vice versa, will indicate the passage of the voltage $e_1$ through zero voltage or such other predetermined value. In such a case, there is a comparison of the voltage $e_1$ with, for example, a zero voltage reference. By utilizing a finite voltage $e_2$, the comparison amplitude level is shifted from zero and the voltage $e_1$ is then compared with the voltage $e_2$, as above explained.

If the voltages $e_1$ and $e_2$ are of the direct-current type, they are preferably prevented from reaching the differential amplifier I, II through the use of the blocking condensers 35 and 39. While the voltages $e_1$ and $e_2$ control the nature of the net feedback by modifying the impedance of the non-linear element $R_x$ regulating the relative voltage levels of the bridge output terminals 15 and 17, noise and other voltages in the bridge 3 itself will operate the differential amplifier I, II. The operation of the amplifier I, II of Fig. 1 is thus independent of the actual amplitudes of the voltages $e_1$ and $e_2$ and independent of the rate of change of amplitude of such voltages. Through the use of the two feedback loops or paths, one positive and one negative, moreover, with the system sharply changing between a stable and an oscillatory or regenerative state upon the passage of the voltage $e_1$ through amplitude equality with the voltage $e_2$, the gain usable in the differential amplifier I, II is unlimited, being theoretically infinite. This is in contrast with the prior-art single positive feedback-loop system, before described, in which a maximum gain of two can be achieved in response to a change of loop gain from less than unity to more than unity. The greater the amplifier gain in the differential amplifier of the present invention, however, the smaller the voltage variation in the input of the bridge 3 that is necessary to change the system from negative to positive feedback conditions, and hence the greater the sensitivity of the system. For optimum sensitivity, the resistance value of the arm $R_a$ is made substantially equal to that of the arm $R_b$, as before discussed, and the arm $R_0$ is selected at a value substantially equal to the resistance of the non-linear element $R_x$ at its point of maximum non-linearity. The gain of the amplifier I, II is made as large as possible. With a practical system of this character, the amplitude equality of the voltages $e_1$ and $e_2$ has been measured to within a few millivolts, but greater sensitivity still can be achieved with more stable non-linear elements and amplifiers of greater gain.

Figure 2:
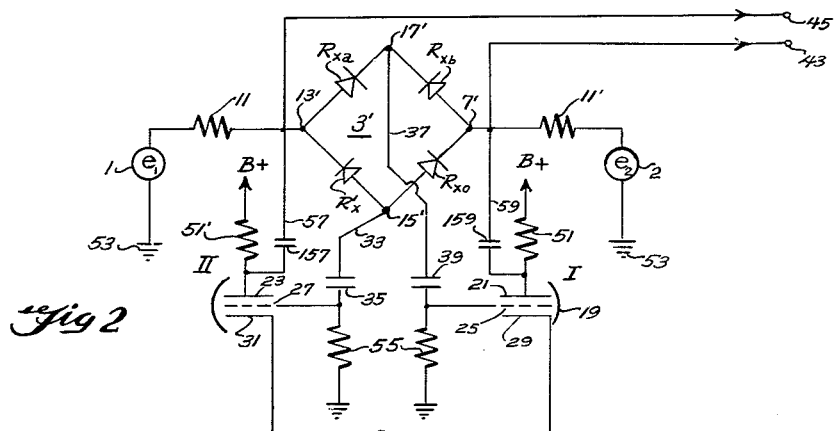
Fig. 2 is a similar diagram of a preferred embodiment of the invention.

It is by no means necessary, as before indicated, that the voltage sources 1 and 2 be disposed as in Fig. 1, or that the bridge 3 assume the form illustrated in Fig. 1. In the system of Fig. 2, for example, the source 1 is shown connected through the resistor 11 to the input terminal 13' of a modified bridge 3' that is oriented through ninety degrees from the orientation of the bridge 3 of Fig. 1. The bridge 3', moreover, embodies a non-linear element in each arm, as shown at $R_x'$, $R_{xo}$, $R_{xa}$ and $R_{xb}$. The voltage source $e_2$ is connected through a resistor 11' to the other bridge input terminal 7'. The voltage sources $e_1$ and $e_2$ are connected together through ground terminals 53. This system is thus of a double-ended variety with the input voltages developed with respect to ground, as compared with the single-ended feed system of Fig. 1. The bridge output terminals 15' and 17' correspond to the terminals 15 and 17 of Fig. 1 and are similarly connected to the differential amplifier I, II, the two tube sections of which are shown interchanged from right to left with respect to their positions in Fig. 1. Each control-grid electrode 25, 27, moreover, is provided with a grounded grid-leak resistor 55, and the plates 21 and 23 are connected through separate plate loads 51 and 51' to the B+ terminal of the plate power supply. The plate 23 is connected by conductor 57 through a blocking condenser 157 to the bridge input terminal 13' and the plate 21 is connected by conductor 59 through a similar blocking condenser 159 to the input terminal 7'. The output terminals 43 and 45 of the complete comparison circuit are also connected to the bridge input terminals 7' and 13'. The system of Fig. 2 operates in a manner similar to that described in connection with the embodiment of Fig. 1, the non-linear elements $R_x'$, $R_{xo}$ and $R_{xa}$ and $R_{xb}$ preferably being matched as closely as possible in order to present substantially the same impedance characteristics.

Figure 3:
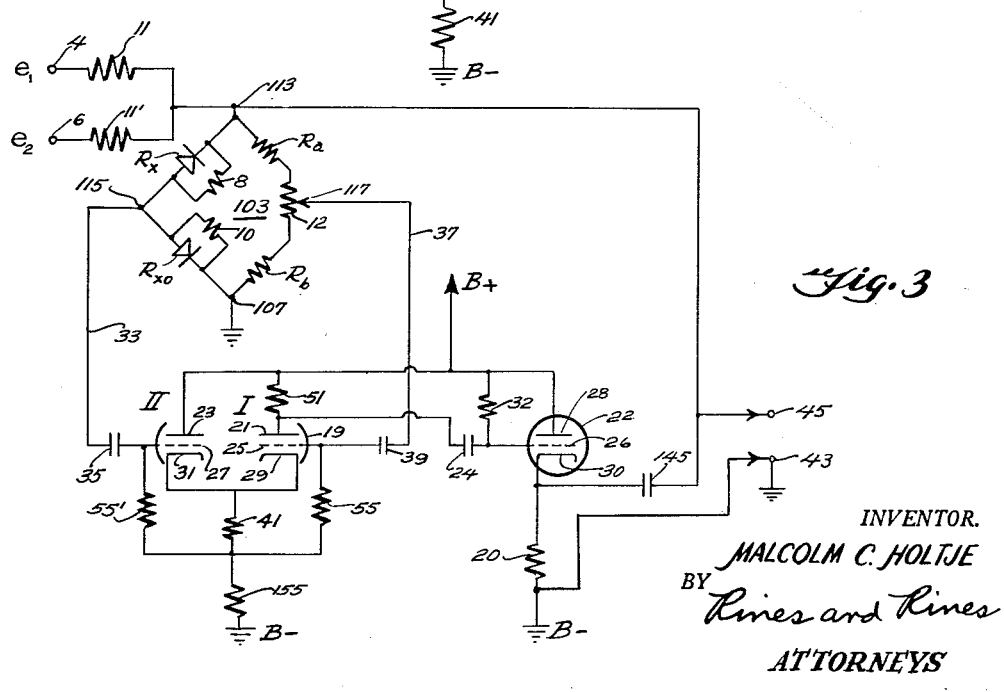
Fig. 3 is a similar diagram of a modification.

Still a further modification is illustrated in Fig. 3 in which the voltages $e_1$ and $e_2$ are applied at the terminals 4 and 6 through resistors 11 and 11' to the input terminal 113 of still a different type of bridge 103. The bridge 103 is provided with a lower preferably grounded vertex 107 that serves as the other input terminal for the application of the voltages $e_1$ and $e_2$. A pair of non-linear elements $R_x$ and $R_{xo}$ are used, each shunted by fixed resistors 8 and 10. These resistors 8 and 10 serve to reduce the effect of the inherent long time-constant energy-storage charging circuit comprising the stray capacitance of the circuit and the non-linear elements. The other two arms of the bridge 103 embody the resistors $R_a$ and $R_b$. Between the arms $R_a$ and $R_b$ is inserted a further resistance 12, the variably positioned tap 117 of which enables the voltage-amplitude selection point to be varied and serves as an output terminal of the bridge, being connected to the amplifier I of the differential amplifier I, II, in the manner described in connection with Fig. 2. The other output terminal 115 is connected to the amplifier II. The control grids 25 and 27 of the amplifiers I and II are returned to the grounded B— terminal of the power supply through grid-leak resistors 55, 55′ and a common resistor 155, and the cathodes 29 and 31 are also returned to the B— terminal through the resistor 41 and the resistor 155. Instead of applying the feedback loops or paths directly from the differential amplifier I, II, to the bridge input terminals, as in Figs. 1 and 2, the amplifier I, II is connected to a cathode follower 22. The feedback connection to the input terminal 113 is effected from the load 20 of the cathode-follower 22 by way of a condenser 145. The plate 21 of the amplifier I of the differential amplifier I, II, is coupled through condenser 24 to the control-grid electrode 26 of the cathode-follower tube 22. The plate 28 of the cathode follower 22 is connected to the B+ terminal, and its cathode 30 is connected to the B— terminal through the cathode load 20. A large dropping resistor 32 connects the B+ terminal to the control-grid electrode 26 to operate the tube 22 near zero bias. The output 43, 45 of the system may, for example, be employed to trigger a bi-stable multivibrator or similar circuit, not shown, to provide a high-power pulse that may, in turn, actuate a stylus of a recorder, not shown. The same remarks apply to the output terminals 43, 45 of the other embodiments of the invention.

As an illustration of typical circuit values and parameters, suitable for direct-current signals, the system of Fig. 2 may employ crystal-diode non-linear elements, such as the type 1N67–A crystal. The resistors 11 and 11′ may each have a value of about 20,000 ohms, and the plate loads 51, 51′ and grid leaks 55 may each have a value of about 10,000 ohms. The blocking condensers 35, 39, 157 and 159 may each have a value of about 52 micro-micro farads. The plate supply source B+, B— may provide a voltage of the order of 250 volts, more or less. The differential amplifier I, II, may comprise a type 12AT7 double triode. As another example, the bridge 103 of Fig. 3 may also utilize type 1N67–A crystals. The resistance arms $R_a$ and $R_b$ may have values of about 3500 ohms, and the resistors 8 and 10 may be about 100,000 ohms. The variable resistor 12 may have a maximum resistance value of about 3,000 ohms, and the signal-input resistors 11, 11′ may each be of about 10,000 ohms resistance. The condensers 24 and 39 may have values of about 20 micromicro farads; the condenser 35, about 10 micromicro farads; and the output condenser 145, about 45 micromicro farads. The bias resistor 32 may be about one megohm; the plate load 51, about 40,000 ohms; the grid leaks 55, 55′, about 100,000 ohms; the cathode resistor 41, about 560 ohms; the resistor 155, about 8900 ohms; and the cathode follower load 20, about 22,000 ohms. The cathode follower tube 22 itself may be one-half section of a 5963–type electron tube.

Further modifications will occur to those skilled in the art and all such are considered to fall within the spirit and scope of the invention as defined in the appended claims.

What is claimed is:

1. An electric system having, in combination, a bridge provided with an input and an output, at least one of the arms of the bridge containing a non-linear device, means for applying a voltage to the input of the bridge to vary the impedance of the non-linear device, and differential amplifying means interconnecting the input and output of the bridge to provide a pair of opposite polarity feedback loops.

2. An electric system having, in combination, a bridge provided with an input and an output, at least one of the arms of the bridge containing a non-linear device, means for applying a voltage to the input of the bridge to vary the impedance of the non-linear device, differential amplifying means, means for connecting the differential amplifying means to the input of the bridge comprising means for preventing the said voltage from reaching the differential amplifying means, and means for connecting the differential amplifying means to the output of the bridge to provide a pair of opposite polarity feedback loops between the input and output of the bridge.

3. An electric system having, in combination, a bridge provided with an input and an output, at least one of the arms of the bridge containing a non-linear diode device, means for applying a voltage to the input of the bridge to vary the impedance of the non-linear diode device, differential amplifying means, means for connecting the differential amplifying means to the input of the bridge comprising condenser means for preventing the said voltage from reaching the differential amplifying means, and means for connecting the differential amplifying means to the output of the bridge to provide a pair of opposite polarity feedback loops between the input and output of the bridge.

4. An electric system for determining when a voltage reaches a predetermined amplitude having, in combination, a bridge provided with two pairs of arms connected to provide an input and an output, at least one of the arms of one of the pair of arms of the bridge containing a non-linear device, means for applying the voltage to the input of the bridge to vary the impedance of the non-linear device, the ratio of the impedance of the other arm of the said one pair of arms to the total impedance of the arms of the said one pair of arms being substantially equal to the ratio of the impedance of one of the arms of the other pair of arms to the total impedance of the arms of the said other pair of arms at the time that the said voltage reaches the said predetermined amplitude, differential amplifying means interconnecting the input and output of the bridge to provide a pair of opposite polarity feedback loops, and output terminals connected to the system for permitting the detection of a transition between feedbacks of opposite polarities in the pair of loops in order to indicate that the said voltage has reached the said predetermined amplitude.

5. An electric system for determining when a voltage reaches a predetermined amplitude having, in combination, a bridge provided with two pairs of arms connected to provide an input and an output, at least one of the arms of one of the pair of arms of the bridge containing a non-linear device, means for applying the voltage to the input of the bridge to vary the impedance of the non-linear device, the impedance of the other arm of the said one pair of arms being substantially equal to the impedance of the non-linear device at the time that the said voltage reaches the said predetermined amplitude and the impedances of the arms of the other pair of arms being substantially equal, differential amplifying means interconnecting the input and output of the bridge to provide a pair of opposite polarity feedback loops, and output terminals connected to the system for permitting the detection of a transition beween feedbacks of opposite polarities in the pair of loops in order to indicate when the said voltage has reached the said predetermined amplitude.

6. An electric system for determining when a voltage reaches a predetermined amplitude having, in combination, a bridge provided with two pairs of arms connected to provide an input and an output, at least one of the arms of one of the pair of arms of the bridge containing a non-linear device, the region of maximum non-linearity of which occurs substantially at a voltage of amplitude equal to the said predetermined amplitude, means for applying the voltage to the input of the bridge to vary the impedance of the non-linear device, the impedance of the other arm of the said one pair of arms being substantially equal to the impedance of the non-linear device at the time that the said voltage reaches the said predetermined amplitude and the impedances of the arms of the other pair of arms being substantially equal, differential amplifying means interconnecting the input and output of the bridge to provide a pair of opposite polarity feedback loops, and output terminals connected to the system for permitting the detection of a transition beween feedbacks of opposite polarities in the pair of loops in order to indicate when the said voltage has reached the said predetermined amplitude.

7. An electric system for determining when a voltage reaches a predetermined amplitude having, in combination, a bridge provided with two pairs of arms connected to provide an input and an output, at least one of the arms of one of the pair of arms of the bridge containing a non-linear diode device the region of maximum non-linearity of which occurs substantially at a voltage of amplitude equal to the said predetermined amplitude, means for applying the voltage to the input of the bridge to vary the impedance of the non-linear device, the impedance of the other arm of the said one pair of arms being substantially equal to the impedance of the non-linear device at the time that the said voltage reaches the said predetermined amplitude and the impedances of the arms of the other pair of arms being substantially equal, differential amplifying means, means for connecting the differential amplifying means to the input of the bridge comprising means for preventing the said voltage from reaching the differential amplifying means, means for connecting the differential amplifying means to the output of the bridge to provide a pair of opposite polarity feedback loops between the input and output of the bridge, and output terminals connected to the system for permitting the detection of a transition between feedbacks of opposite polarities in the pair of loops in order to indicate when the said voltage has reached the said predetermined amplitude.

8. An electric system for comparing the amplitude of a pair of voltages having, in combination, a bridge provided with an input and an output, at least one of the arms of the bridge containing a non-linear device, means for applying the pair of voltages to the input of the bridge to vary the impedance of the non-linear device, differential amplifying means interconnecting the input and output of the bridge to provide a pair of opposite polarity feedback loops, and output terminals connected to the system for permitting the detection of a transition between feedbacks of opposite polarities in the pair of loops in order to indicate amplitude equality of the pair of voltages.

9. An electric system for comparing the amplitude of a pair of voltages having, in combination, a bridge provided with an input and an output, at least one of the arms of the bridge containing a non-linear device, means for applying the pair of voltages to the input of the bridge to vary the impedance of the non-linear device, differential amplifying means, means for connecting the differential amplifying means to the input of the bridge comprising means for preventing the said voltages from reaching the differential amplifying means, means for connecting the differential amplifying means to the output of the bridge to provide a pair of opposite polarity feedback loops, and output terminals connected to the system for permitting the detection of a transition between feedbacks of opposite polarities in the pair of loops in order to indicate amplitude equality of the pair of voltages.

10. An electric system for comparing the amplitude of a pair of voltages having, in combination, a bridge provided with two pairs of arms connected to provide an input and an output, at least one of the arms of one of the pair of arms of the bridge containing a non-linear device, means for applying the pair of voltages to the input of the bridge to vary the impedance of the non-linear device, the ratio of the impedance of the other arm of the said one pair of arms to the total impedance of the arms of the said one pair of arms being substantially equal to the ratio of the impedance of one of the arms of the other pair of arms to the total impedance of the arms of the said other pair of arms at the time that the said voltages are of substantially equal amplitude, differential amplifying means interconnecting the input and output of the bridge to provide a pair of opposite polarity feedback loops, and output terminals connected to the system for permitting the detection of a transition between feedbacks of opposite polarities in the pair of loops in order to indicate amplitude equality of the pair of voltages.

11. An electric system for comparing the amplitude of a pair of voltages having, in combination, a bridge provided with two pairs of arms connected to provide an input and an output, at least one of the arms of one of the pair of arms of the bridge containing a non-linear device, means for applying the pair of voltages to the input of the bridge to vary the impedance of the non-linear device, the impedance of the other arm of the said one pair of arms being substantially equal to the impedance of the non-linear device at the time that the said voltages are of substantially equal amplitude and the impedances of the arms of the other pair of arms being substantially equal, differential amplifying means interconnecting the input and output of the bridge to provide a pair of opposite polarity feedback loops, and output terminals connected to the system for permitting the detection of a transition between feedbacks of opposite polarities in the pair of loops in order to indicate amplitude equality of the pair of voltages.

12. An electric system for comparing the amplitude of a pair of voltages having, in combination, a bridge provided with two pairs of arms connected to provide an input and an output, at least one of the arms of one of the pair of arms of the bridge containing a non-linear device, means for applying the pair of voltages to the input of the bridge to vary the impedance of the non-linear device, the impedance of the other arm of the said one pair of arms being substantially equal to the impedance of the non-linear device at the time that the said voltages are of substantially equal amplitude, the said non-linear device having a region of substantially maximum non-linearity at such time, and the impedances of the arms of the other pair of arms being substantially equal, differential amplifying means interconnecting the input and output of the bridge to provide a pair of opposite polarity feedback loops, and output terminals connected to the system for permitting the detection of a transition between feedbacks of opposite polarities in the pair of loops in order to indicate amplitude equality of the pair of voltages.

13. An electric system for comparing the amplitude of a pair of voltages having, in combination, a bridge provided with two pairs of arms connected to provide a pair of input and a pair of output terminals, the arms of one pair of arms comprising substantially equal resistance elements and the arms of the other pair of arms comprising a resistance element and a non-linear device, respectively, means for applying the pair of voltages to the pair of input terminals of the bridge to vary the impedance of the non-linear device, the impedance of the non-linear device being substantially equal to the impedance of the said resistance element of the said other pair of arms at the time that the said voltages are of substantially equal amplitude, a pair of electron-tube differential amplifiers each having an input and an output, means for connecting each of the pair of output terminals of the bridge to the input of one of the pair of electron-tube amplifiers and means for connecting the output of the said amplifiers to the pair of input terminals of the bridge to provide a pair of opposite polarity feedback loops, and further output terminals connected to the output of the said amplifiers for permitting the detection of a transition between feedbacks of opposite polarities in the pair of loops in order to indicate amplitude equality of the pair of voltages.

14. An electric system for comparing the amplitude of a pair of voltages having, in combination, a bridge provided with two pairs of arms connected to provide a pair of input and a pair of output terminals, each of the arms comprising a similar non-linear device, means for applying the pair of voltages to the pair of input terminals of the bridge to vary the impedance of the non-linear devices, a pair of electron-tube differential amplifiers each having an input and an output, means for connecting each of the pair of output terminals of the bridge to the input of one of the pair of electron-tube amplifiers and means for connecting the output of each of the said pair of electron-tube amplifiers to one of the input terminals of the bridge to provide a pair of opposite polarity feedback loops, and further output terminals connected to the output of the said amplifiers for permitting the detection of a transition between feedbacks of opposite polarities in the pair of loops in order to indicate amplitude equality of the pair of voltages.

15. An electric system for comparing the amplitude of a pair of voltages having, in combination, a bridge provided with two pairs of arms connected to provide a pair of input and a pair of output terminals, each arm of one pair of arms comprising a non-linear device shunted by a resistance element and the arms of the other pair of arms comprising resistance elements, means for applying the pair of voltages to the pair of input terminals of the bridge to vary the impedance of the non-linear devices, a pair of electron-tube differential amplifiers each having an input and an output, means for connecting each of the pair of output terminals of the bridge to the input of one of the pair of electron-tube amplifiers, a cathode-follower tube having an input and an output, means for connecting the output of the said amplifiers to the input of the cathode-follower tube, and means for connecting the output of the cathode-follower tube to the input terminals of the bridge to provide a pair of opposite polarity feedback loops, and further output terminals connected to the output of the cathode-follower tube for permitting the detection of a transition between feedbacks of opposite polarities in the pair of loops in order to indicate amplitude equality of the pair of voltages.

16. In a system embodying a bridge having an input and an output and containing a non-linear device, a method of the character described that comprises, applying a voltage to the input, feeding voltages developed at the output other than the said voltage along two separate paths, and connecting the two paths back to the input to feed back voltages therein to the input in opposite polarities.

17. In a system embodying a bridge having an input and an output and containing a non-linear device, a method of the character described that comprises, applying a pair of voltages to the input, feeding voltages developed at the output other than the said pair of voltages along two separate paths, connecting the two paths back to the input to feed back voltages therein to the input in opposite polarities, and detecting the transition in the fed-back voltages from one polarity to the other in order to indicate amplitude equality of the pair of voltages.

18. An electric system for determining when a voltage reaches a predetermined amplitude having, in combination, a bridge provided with two pairs of arms connected to provide an input and an output, at least one of the arms of one of the pair of arms of the bridge containing a non-linear device, means for applying the voltage to the input of the bridge to vary the impedance of the non-linear device, the ratio of the impedance of the other arm of the said one pair of arms to the total impedance of the arms of the said one pair of arms being substantially equal to the ratio of the impedance of one of the arms of the other pair of arms to the total impedance of the arms of the said other pair of arms at the time that the said voltage reaches the said predetermined amplitude, differential amplifying means interconnecting the input and output of the bridge to provide a pair of opposite polarity feedback loops, and output terminals connected to the system for permitting the detection of a transition between an oscillatory system condition, indicative of a net positive polarity feedback in the loops and a non-oscillatory system condition, indicative of a net negative polarity feedback in the loops, thereby to indicate that the said voltage has reached the said predetermined amplitude.

References Cited in the file of this patent

UNITED STATES PATENTS

| | | |
|---|---|---|
| 2,410,669 | Lynn | Nov. 5, 1946 |
| 2,614,227 | Bordewieck et al. | Oct. 14, 1952 |
| 2,675,538 | Malthaner et al. | Apr. 13, 1954 |
| 2,675,539 | McGuigan | Apr. 13, 1954 |